United States Patent
Hong et al.

(10) Patent No.: US 7,486,343 B2
(45) Date of Patent: Feb. 3, 2009

(54) TFT ARRAY PANEL HAVING A TWO-PORTION COUPLING ELECTRODE EXTENDING FROM DRAIN ELECTRODE IN DIFFERENT DIRECTIONS WITH FIRST PORTION EXTENDING ALONG A GAP BETWEEN TWO OVERLAPPING SUBPIXEL ELECTRODES THEREON AND SECOND PORTION EXTENDING IN SAME DIRECTION AS DATA LINE

(75) Inventors: Sung-Kyu Hong, Seongnam-si (KR); Joo-Han Kim, Yongin-si (KR); Jae-Jin Lyu, Gyeonggi-do (KR); Sung-Hwan Hong, Gwangmyeong-si (KR); Won-Jae Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 262 days.

(21) Appl. No.: 11/100,516

(22) Filed: Apr. 7, 2005

(65) Prior Publication Data
US 2005/0253979 A1 Nov. 17, 2005

(30) Foreign Application Priority Data
Apr. 8, 2004 (KR) ...................... 10-2004-0024071

(51) Int. Cl.
*G02F 1/136* (2006.01)

(52) U.S. Cl. ............................ 349/42; 349/43; 349/139

(58) Field of Classification Search .................. 349/38, 349/39, 42, 43, 139
See application file for complete search history.

(56) References Cited

U.S. PATENT DOCUMENTS

| 4,840,460 | A | | 6/1989 | Bernot et al. | |
|---|---|---|---|---|---|
| 5,748,276 | A | | 5/1998 | Uno et al. | |
| 6,091,464 | A | | 7/2000 | Song | |
| 6,133,967 | A | * | 10/2000 | Moon | 349/39 |
| 7,113,233 | B2 | * | 9/2006 | Lyu | 349/38 |
| 2005/0030439 | A1 | | 2/2005 | Lyu | |
| 2006/0028589 | A1 | * | 2/2006 | Um et al. | 349/33 |

FOREIGN PATENT DOCUMENTS

JP 05289108 A * 11/1993

* cited by examiner

*Primary Examiner*—David Nelms
*Assistant Examiner*—John S. Heyman
(74) *Attorney, Agent, or Firm*—MacPherson Kwok Chen & Heid LLP

(57) ABSTRACT

A thin film transistor array panel including a substrate; a gate line formed on the substrate; a gate insulating layer formed on the gate line; a semiconductor layer formed on the gate insulating layer; a data line formed on the semiconductor layer; a drain electrode separated from the data line and formed on the semiconductor layer; a coupling electrode connected to the drain electrode; a first subpixel electrode connected to the drain electrode; and a second subpixel electrode separated from the first subpixel electrode and overlapping the coupling electrode.

12 Claims, 8 Drawing Sheets

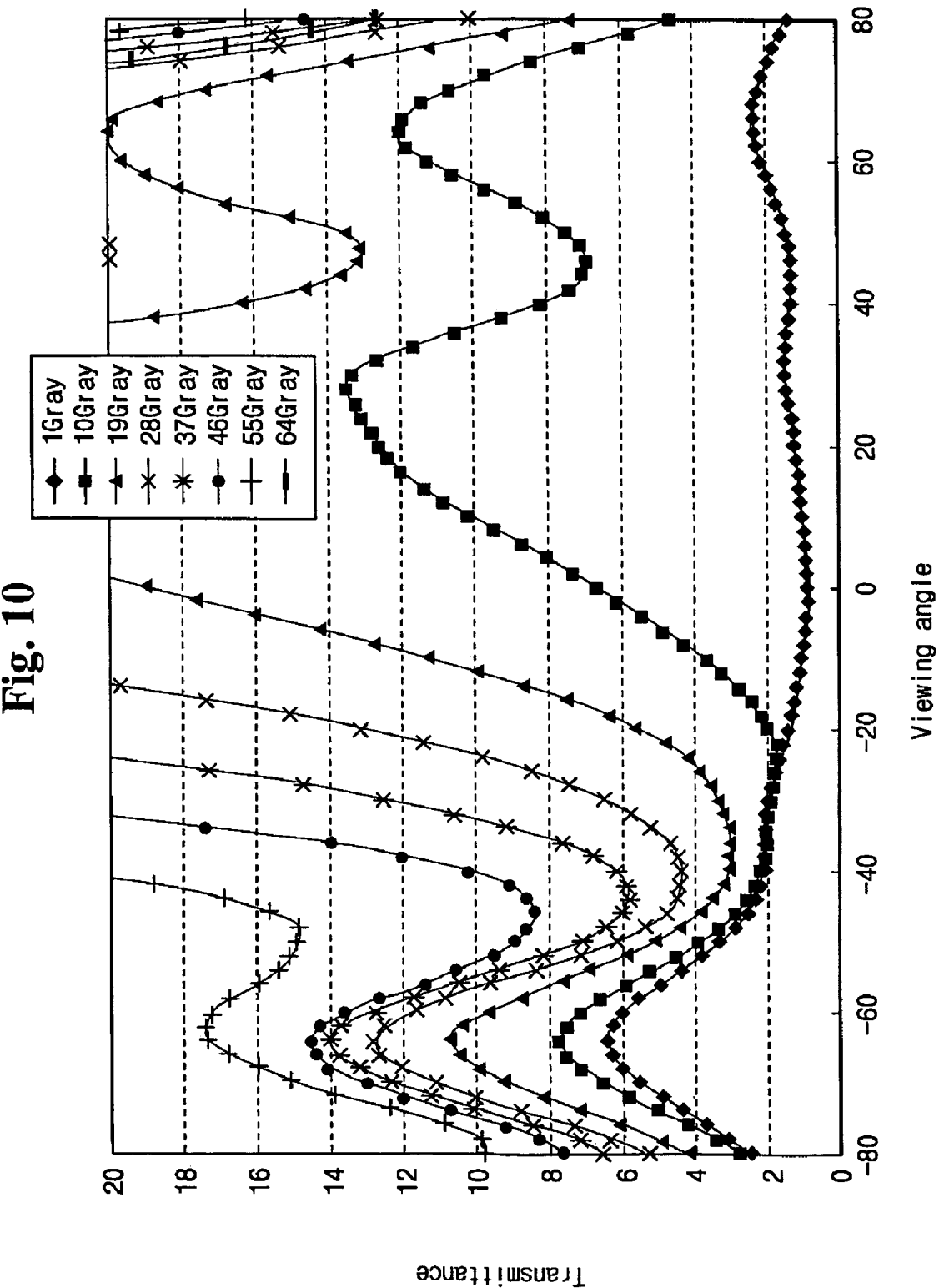

US 7,486,343 B2

TFT ARRAY PANEL HAVING A TWO-PORTION COUPLING ELECTRODE EXTENDING FROM DRAIN ELECTRODE IN DIFFERENT DIRECTIONS WITH FIRST PORTION EXTENDING ALONG A GAP BETWEEN TWO OVERLAPPING SUBPIXEL ELECTRODES THEREON AND SECOND PORTION EXTENDING IN SAME DIRECTION AS DATA LINE

CROSS REFERENCE TO RELATED APPLICATION

This application claims priority to and the benefit of Korean Patent Application No. 10-2004-0024071, filed on Apr. 8, 2004, which is hereby incorporated by reference for all purposes as if fully set forth herein.

BACKGROUND OF THE INVENTION

1. Field of the Invention

The present invention relates to a liquid crystal display. More particularly, this invention relates to an arrangement of pixel electrodes and capacitors in a pixel of a liquid crystal display.

2. Discussion of the Background

A liquid crystal display (LCD) is one of the most widely used flat panel displays. Generally, an LCD includes two panels having field-generating electrodes, such as pixel is electrodes and a common electrode, and a liquid crystal (LC) layer interposed between the two panels. The LCD displays images by applying voltages to the field-generating electrodes to generate an electric field in the LC layer, which determines LC molecule orientations to adjust polarization of incident light.

Among the LCDs, a twisted nematic (TN) mode LCD aligns LC molecules such that their long axes are parallel to the panels and twisted from one panel to the other in the absence of an electric field. Since the liquid crystal of the TN mode LCD has positive dielectric anisotropy, an electric field that is perpendicular to the panels aligns the LC molecules in parallel to the field direction, i.e., perpendicular to the panels.

However, the LCD has a viewing direction dependency due to the refractive anisotropy. In detail, the color and the contrast ratio greatly depend on the viewing direction such that the reference viewing angle is narrow and gray inversion may occur. In particular, the LCD image may have poor quality when viewed from the side as compared to when viewed from the front. For example, the LCD shows an image that becomes brighter as the viewer moves from the display's front to its side. In the worse case, the luminance difference between high grays vanishes such that the images cannot be perceived.

SUMMARY OF THE INVENTION

The present invention provides an LCD that may reduce gray scale inversion at wider viewing angles, thereby improving lateral visibility.

Additional features of the invention will be set forth in the description which follows, and in part will be apparent from the description, or may be learned by practice of the invention.

The present invention discloses a thin film transistor array panel including a substrate, a gate line formed on the substrate, a gate insulating layer formed on the gate line, and a semiconductor layer formed on the gate insulating layer. A data line is formed on the semiconductor layer, and a drain electrode, which is separate from the data line, is formed on the semiconductor layer. A coupling electrode is connected to the drain electrode, a first subpixel electrode is connected to the drain electrode, and a second subpixel electrode is separated from the first subpixel electrode and overlaps the coupling electrode.

The present invention also discloses a LCD including a first panel, a second panel facing the first panel and including a common electrode, and a liquid crystal layer disposed between the first panel and the second panel. The first panel includes a gate line, a gate insulating layer formed on the gate line, a semiconductor layer formed on the gate insulating layer, a data line formed on the semiconductor layer, a drain electrode separated from the data line and formed on the semiconductor layer, a coupling electrode connected to the drain electrode, a first subpixel electrode connected to the drain electrode, and a second subpixel electrode separated from the first subpixel electrode and overlapping the coupling electrode.

The present invention also discloses a pixel region of a TFT array panel comprising a TFT having a gate electrode coupled to a first signal line and a first electrode coupled to a second signal line, a coupling electrode connected to a second electrode of the TFT, a first subpixel electrode connected to the second electrode, and a second subpixel electrode separated from the first subpixel electrode and overlapping the coupling electrode. The pixel region is within adjacent first signal lines and adjacent second signal lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 9 and FIG. 10 are graphs illustrating light transmittance of a conventional TN type LCD and the LCD shown in FIGS. 1-4, respectively, for eight grays as a function of viewing angle.

DETAILED DESCRIPTION OF THE ILLUSTRATED EMBODIMENTS

Figure 1:
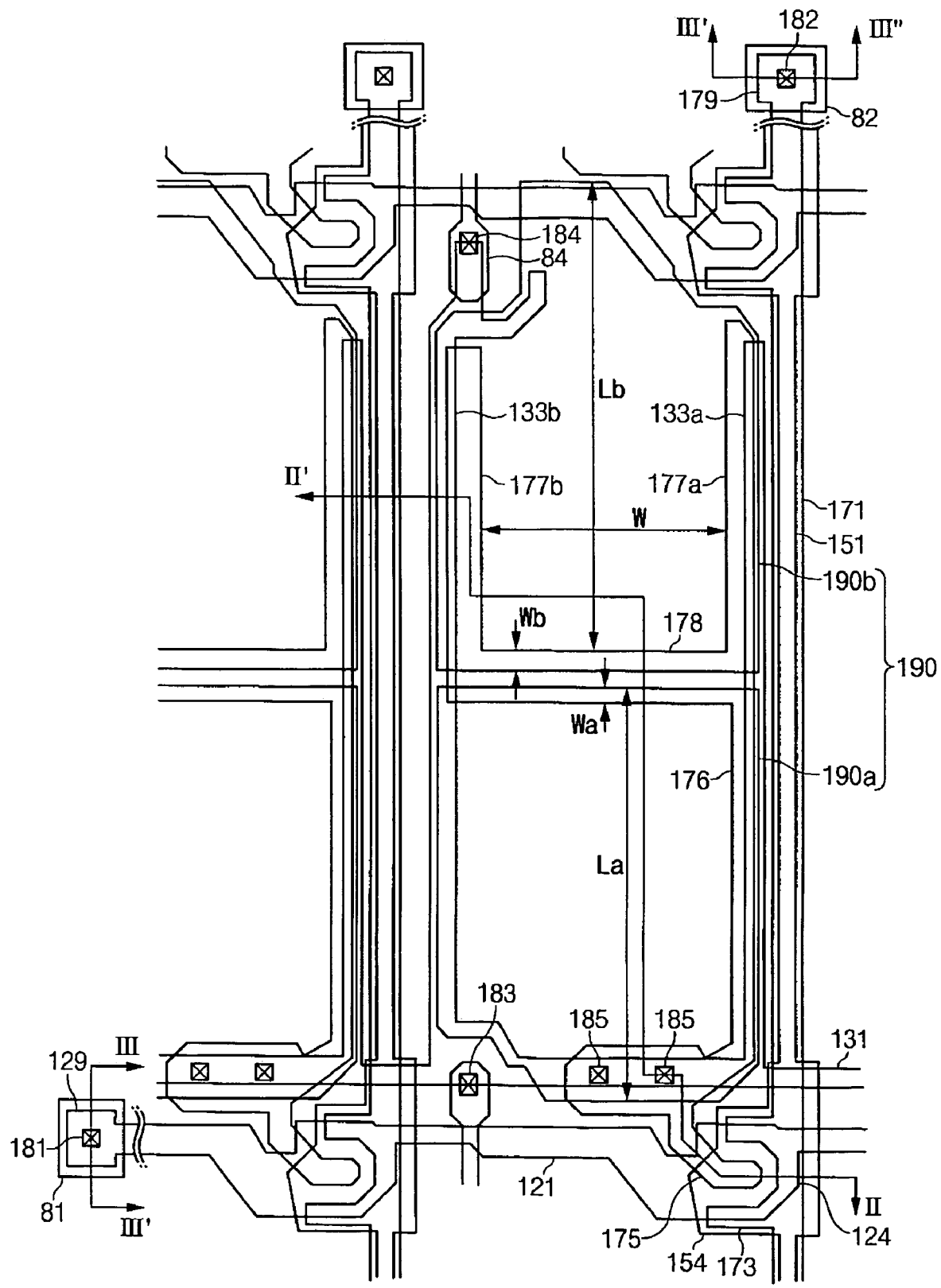
FIG. 1 is a layout view showing a thin film transistor (TFT) array panel for an LCD according to an exemplary embodiment of the present invention.

The present invention now will be described more fully hereinafter with reference to the accompanying drawings, which show exemplary embodiments of the invention. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as, for example, a layer, film, region or substrate is referred to as being "on" another element, it can be directly on the other element or intervening elements may also be present. In contrast, when an element is referred to as being "directly on" another element, there are no intervening elements present.

An LCD according to an exemplary embodiment of the present invention is described in detail with reference to FIG. 1, FIG. 2, and FIG. 3.

Figure 2:
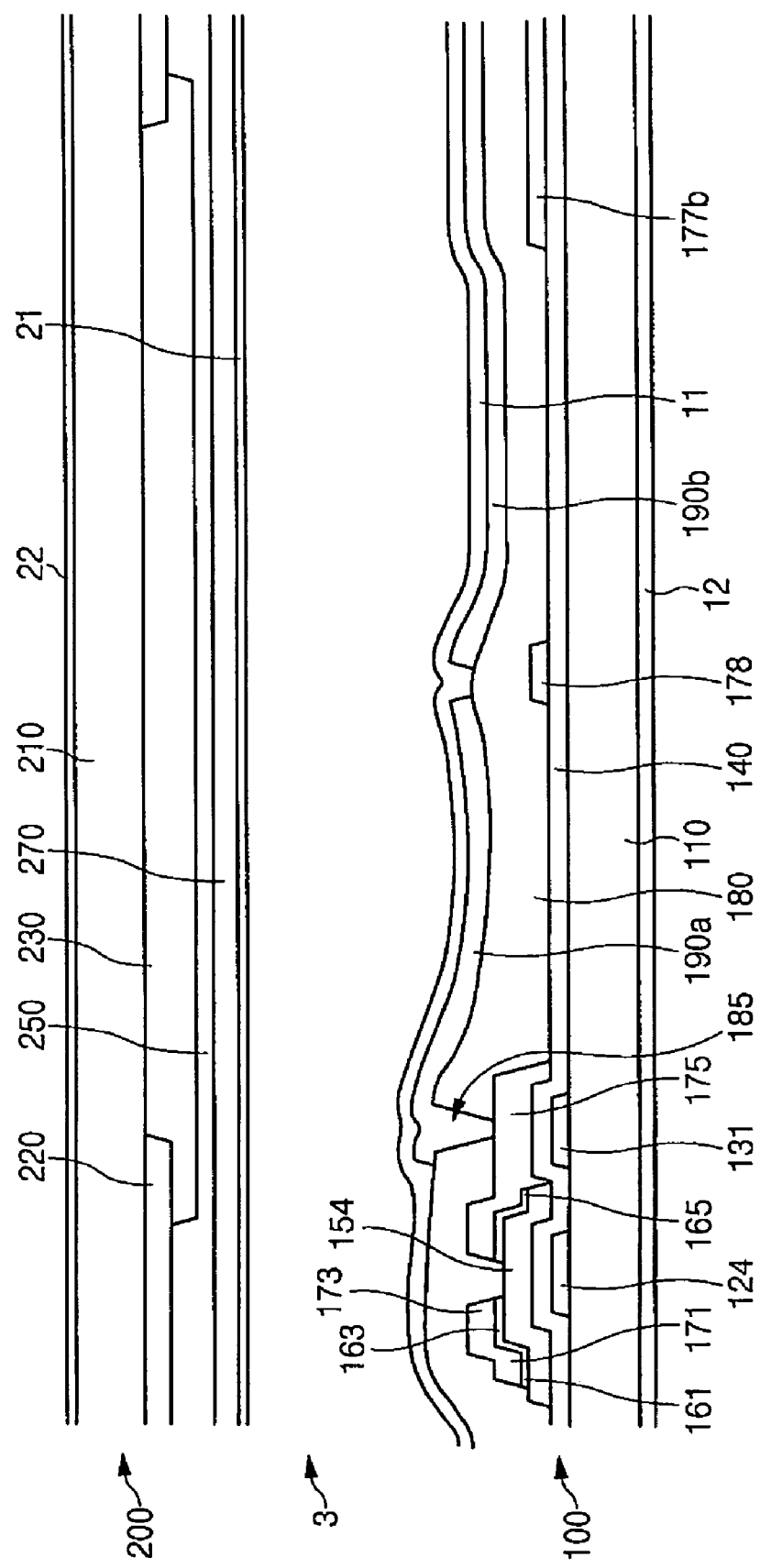
FIG. 2 is a sectional view showing an LCD including the TFT array panel of FIG. 1 taken along line II-II' of FIG. 1.
Figure 3:
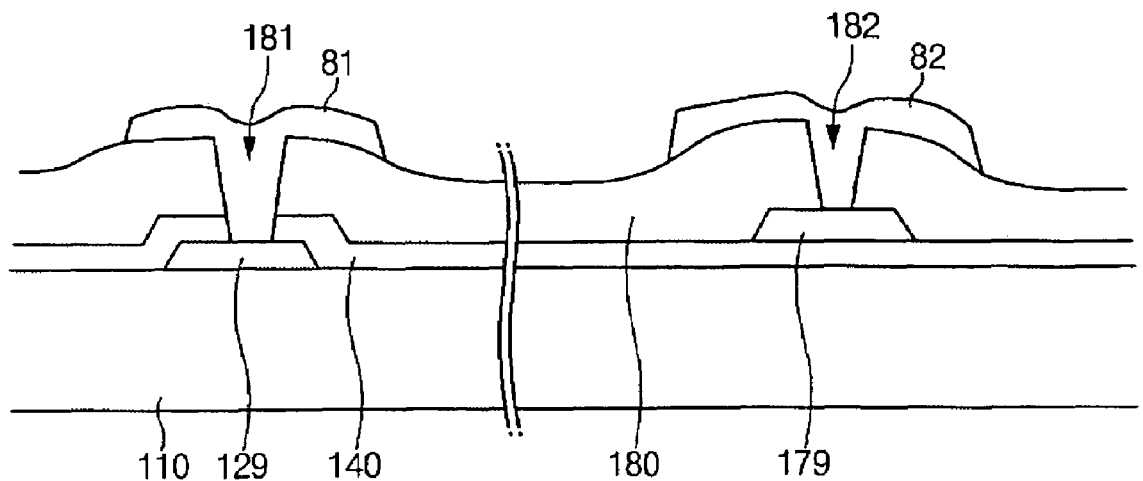
FIG. 3 is a sectional view showing an LCD including the TFT array panel of FIG. 1 taken along lines III-III' and III'-III" of FIG. 1.

FIG. 1 is a layout view showing a TFT array panel for an LCD according to an exemplary embodiment of the present invention, FIG. 2 is a sectional view showing an LCD including the TFT array panel of FIG. 1 taken along line II-II' of FIG. 1, and FIG. 3 is a sectional view showing the LCD including the TFT array panel of FIG. 1 taken along lines III-III' and III'-III" of FIG. 1.

An LCD according to an embodiment of the present invention may include a TFT array panel 100, a common electrode panel 200 facing the TFT array panel 100, and a LC layer 3 interposed between the TFT array panel 100 and the common electrode panel 200.

The TFT array panel 100 is now described in detail.

A plurality of gate lines 121 and a plurality of storage electrode lines 131 may be formed on an insulating substrate 110, which may be made of, for example, transparent glass.

Separate gate lines 121 extend substantially in a transverse direction to transmit gate signals. Each gate line 121 includes a plurality of gate electrodes 124, which project downward in a longitudinal direction, and an end portion 129, which has a large area for coupling with another layer or a driving circuit. The driving circuit may be integrated on the TFT array panel 100.

Each storage electrode line 131 extends substantially in the transverse direction and nearby to one of two adjacent gate lines 121. Each storage electrode line 131 includes a plurality of pairs of storage electrodes 133a and 133b, which extend in a longitudinal direction. The storage electrode 133b has a fixed end portion and a free end portion. The fixed end portion of the storage electrode 133b has a large area where it is connected to the storage electrode line 131, and the free end portion is bifurcated into a linear branch and a curved branch. The storage electrode lines 131 may be supplied with a predetermined voltage such as a common voltage, which is applied to a common electrode 270 on the LCD's common electrode panel 200. Each storage electrode line 131 may include a pair of stems extending in the transverse direction and may have various shapes.

The gate lines 121 and the storage electrode lines 131 may be made of an Al material such as, for example, Al and Al alloy, an Ag material such as, for example, Ag and Ag alloy, a Cu material such as, for example, Cu and Cu alloy, a Mo material such as, for example, Mo and Mo alloy, Cr, Ti, Ta, or other like materials. The gate lines 121 and the storage electrode lines 131 may have a multi-layered structure including two films with different physical characteristics. One of the two films may be made of low resistivity metal including, for example, an Al material, an Ag material, and a Cu material, for reducing signal delay or voltage drop in the gate lines 121 and the storage electrode lines 131. The other film may be made of a material such as, for example, a Mo material, Cr, Ta, Ti, or other like materials, which have good physical, chemical, and electrical contact characteristics with other materials such as indium tin oxide (ITO) or indium zinc oxide (IZO). Therefore, possible multi-layered structures include a lower Cr film and an upper Al (alloy) film or a lower Al (alloy) film and an upper Mo (alloy) film. However, the multi-layered structure may be made of various metals or conductors.

The lateral sides of the gate lines 121 and the storage electrode lines 131 may be inclined relative to a surface of the substrate at an angle in a range of about 30-80 degrees.

A gate insulating layer 140, which may be made of, for example, silicon nitride (SiNx), may be formed on the gate lines 121 and the storage electrode lines 131.

A plurality of semiconductor stripes 151, which may be made of, for example, hydrogenated amorphous silicon (a-Si) or polycrystalline silicon, may be formed on the gate insulating layer 140. Each semiconductor stripe 151 extends substantially in the longitudinal direction and has a plurality of projections 154 branched out toward the gate electrodes 124. The semiconductor stripes 151 widen near the gate lines 121 and the storage electrode lines 131 to cover larger areas of the gate lines 121 and the storage electrode lines 131.

A plurality of ohmic contact stripes and islands 161 and 165, which may be made of, for example, silicide or n+ hydrogenated a-Si heavily doped with n type impurity such as phosphorous, may be formed on the semiconductor stripes 151. Each ohmic contact stripe 161 has a plurality of projections 163, and the projections 163 and the ohmic contact islands 165 may be located in pairs on the projections 154 of the semiconductor stripes 151.

The lateral sides of the semiconductor stripes 151 and the ohmic contacts 161 and 165 may be inclined relative to a surface of the substrate at an angle in a range of about 30-80 degrees.

A plurality of data lines 171 and a plurality of drain electrodes 175, which are separate from the data lines 171, may be formed on the ohmic contacts 161 and 165, respectively.

The data lines 171 extend substantially in the longitudinal direction to transmit data voltages, and they intersect the gate lines 121 and the storage electrode lines 131 such that each data line 171 passes between adjacent pairs of the storage electrodes 133a and 133b. Each data line 171 includes an end portion 179, which has a large area for coupling with another layer or an external device, and a plurality of source electrodes 173, which project toward the drain electrodes 175.

Each drain electrode 175 includes a linear end portion, an expansion, and a coupling electrode 176. The linear end portion may be disposed on a gate electrode 124 and partly enclosed by the source electrode 173. The expansion may be disposed on a storage electrode line 131, and it has a large area for coupling with another layer. The coupling electrode 176 extends from the expansion and includes a first longitudinal portion 177a, a transverse portion 178, and a second longitudinal portion 177b. The first longitudinal portion 177a extends upward from the expansion and along the storage electrode 133a, the transverse portion 178 branches out from the first longitudinal portion 177a near the middle of the first longitudinal portion 177a, and the second longitudinal portion 177b extends upward from an end of the transverse portion 178 and along the storage electrode 133b. The coupling electrode's first and second longitudinal portions 177a and 177b overlap the storage electrodes 133a and 133b such that their outer edges lie on the storage electrodes 133a and 133b. Alternatively, the coupling electrode may be formed of the same layer as the gate line 121.

A gate electrode 124, a source electrode 173, a drain electrode 175, and a projection 154 of a semiconductor stripe 151 form a TFT having a channel formed in the projection 154 and disposed between the source electrode 173 and the drain electrode 175.

The data lines 171 and the drain electrodes 175 may be made of refractory metal such as, for example, Cr, Mo, Ti, Ta or alloys thereof. However, they may have a multi-layered structure including a low-resistivity film (not shown) and a good-contact film (not shown). Examples of a double-layered structure include a lower Cr film and an upper Al (alloy) film, a lower Mo (alloy) film and an upper Al (alloy) film. A triple-layered structure could include a lower Mo film, an intermediate Al film, and an upper Mo film.

Like the gate lines 121 and the storage electrode lines 131, the data lines 171 and the drain electrodes 175 may have edges that are inclined at angles in a range of about 30-80 degrees.

The ohmic contacts 161 and 165 are interposed only between the underlying semiconductor stripes 151 and the overlying conductors 171 and 175 to reduce the contact resistance therebetween. The semiconductor stripes 151 include a plurality of exposed portions, which are not covered with the data lines 171 and the drain electrodes 175, such as portions between the source electrodes 173 and the drain electrodes 175. Although the semiconductor stripes 151 are narrower than the data lines 171 at most places, the semiconductor stripes 151 may widen near the gate lines 121 and the storage electrode lines 131 as described above, to smooth the profile of the surface, thereby preventing the disconnection of the data lines 171. Alternatively, only the projections 154 may remain without other portions of the semiconductor stripes 151. In other words, the projections may be formed as islands.

A passivation layer 180 may be formed on the data lines 171, the drain electrodes 175, and the exposed portions of the semiconductor stripes 151. The passivation layer 180 may be made of, for example, an inorganic insulator, such as silicon nitride or silicon oxide, a photosensitive organic material that may be flattened, or a low dielectric insulating material that has a dielectric constant lower than 4.0, such as a-Si:C:O and a-Si:O:F formed by plasma enhanced chemical vapor deposition (PECVD). The passivation layer 180 may have a double-layered structure including a lower inorganic film and an upper organic film.

The passivation layer 180 has a plurality of contact holes 182 and 185 exposing the end portions 179 of the data lines 171 and the expansions of the drain electrodes 175, respectively. The passivation layer 180 and the gate insulating layer 140 have a plurality of contact holes 181, 183, and 184. The contact holes 181 expose the end portions 129 of the gate lines 121, the contact holes 183 expose portions of the storage electrode lines 131 near the fixed end portions of the storage electrodes 133b, and the contact holes 184 expose the linear branches of the free end portions of the storage electrodes 133b.

A plurality of pixel electrodes 190, a plurality of contact assistants 81 and 82, and a plurality of overpasses 84 may be formed on the passivation layer 180. The pixel electrodes 190, the contact assistants 81 and 82, and the overpasses 84 may be made of, for example, a transparent conductor such as, ITO or IZO, or a reflective conductor such as Ag or Al.

Each pixel electrode 190 may include first and second subpixel electrodes 190a and 190b separated from each other in a region corresponding to the transverse portion 178 of the coupling electrode 176. More specifically, the subpixel electrodes 190a and 190b may have edges along the transverse direction that face each other and overlap the transverse portion 178 of the coupling electrode 176.

The first subpixel electrode 190a may be coupled with the drain electrode 175 through the contact holes 185 such that the first subpixel electrode 190a receives the data voltages from the drain electrode 175. The second subpixel electrode 190b is floated, and it overlaps portions of the coupling electrode 176 to form a coupling capacitor. Accordingly, the second subpixel electrode 190b has a voltage that is induced by the coupling with the drain electrode 175 through the coupling electrode 176.

The first and second subpixel electrodes 190a and 190b, which may be supplied with data voltages or voltages induced by electromagnetic coupling, generate electric fields in cooperation with the common electrode 270. These electric fields determine the orientations of LC molecules in the LC layer 3.

Each subpixel electrode 190a and 190b and the common electrode 270 form a liquid crystal capacitor, which stores applied voltages after the TFT turns off. An additional storage capacitor, which is connected in parallel to the liquid crystal capacitor, may be provided for enhancing the voltage storing capacity. The storage capacitors may be formed by overlapping the storage electrode lines 131, including the storage electrodes 133a and 133b, with the coupled pixel and drain electrodes 190 and 175.

The pixel electrodes 190 and the coupling electrodes 176 have longitudinal edges that overlap the storage electrodes 133a and 133b so that the storage electrodes 133a and 133b may block interference between the pixel electrodes 190 and the data lines 171 and interference between the pixel electrodes 190. The curved branches of the free end portions of the storage electrodes 133b may also overlap edges of the second sub-pixel electrodes 190b.

The contact assistants 81 and 82 are coupled with and cover the end portions 129 of the gate lines 121 and the end portions 179 of the data lines 171 through contact holes 181 and 182, respectively. The contact assistants 81 and 82 protect the end portions 129 and 179 and enhance the adhesion of the end portions 129 and 179 with external devices.

The overpasses 84 cross over the gate lines 121, and they are coupled with the linear branch of the free end portions of the storage electrodes 133b and the storage electrode lines 131 through the contact holes 184 and 183, respectively, which are disposed on opposite sides of the gate lines 121. The overpasses 84 and the storage electrode lines 131, including the storage electrodes 133a and 133b, may be used for repairing defects in the gate lines 121, the data lines 171, or the TFTs.

An alignment layer 11 for initially aligning the LC molecules, which may be homogeneous, is coated on the pixel electrodes 190, the overpasses 84, and the passivation layer 180.

The description of the common electrode panel 200 follows.

A light blocking member 220, which may prevent light leakage and may be called a black matrix, may be formed on an insulating substrate 210 such as, for example, transparent glass. The light blocking member 220 may include a plurality of openings that face the pixel electrodes 190, and it may have substantially the same planar shape as the pixel electrodes 190. Otherwise, the light blocking member 220 may include linear portions corresponding to the data lines 171 and other portions corresponding to the TFTs.

A plurality of color filters 230 are formed on the substrate 210, and they are disposed substantially in the areas enclosed by the light blocking member 220. The color filters 230 may extend substantially along the longitudinal direction along the pixel electrodes 190. The color filters 230 may represent one of the primary colors such as red, green and blue.

An overcoat 250, which may prevent the color filters 230 from being exposed and for providing a flat surface, may be formed on the color filters 230 and the light blocking member 220.

A common electrode 270, which may be made of transparent conductive material such as, for example, ITO and IZO, may be formed on the overcoat 250.

An alignment layer 21, which may be homogeneous, may be coated on the common electrode 270.

A pair of polarizers 12 and 22 are provided on outer surfaces of the panels 100 and 200 such that their polarization axes may be crossed or parallel. One of the polarizers may be omitted when the LCD is a reflective LCD.

The LCD may further include at least one retardation film (not shown) for compensating the retardation of the LC layer 3 and a backlight unit (not shown) supplying light to the LC layer 3.

The LC layer 3 may have positive dielectric anisotropy, and the LC molecules in the LC layer 3 may be aligned such that their long axes are substantially parallel to the surfaces of the panels 100 and 200 in absence of an electric field.

Figure 4:
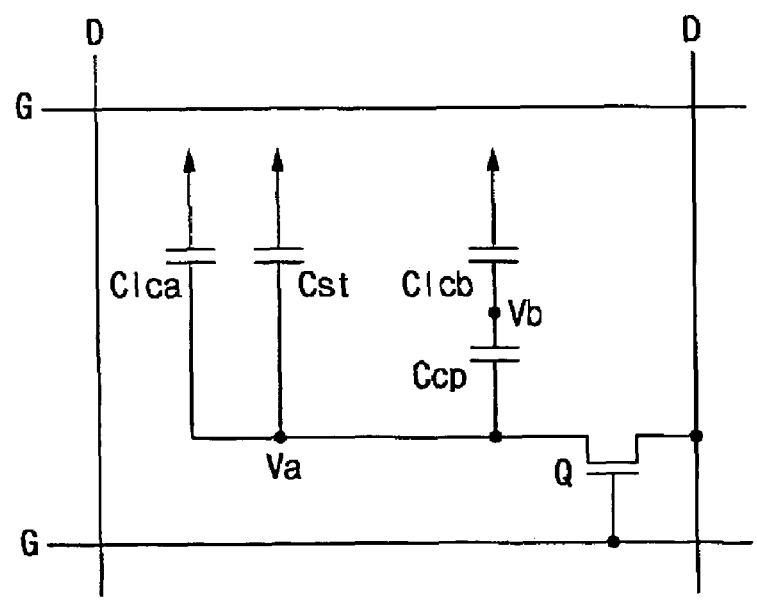
FIG. 4 is an equivalent circuit diagram showing the LCD of FIG. 1, FIG. 2, and FIG. 3.

FIG. 4 shows an equivalent circuit for the LCD of FIG. 1, FIG. 2, and FIG. 3.

Referring to FIG. 4, the LCD includes a plurality of gate lines G, a plurality of data lines D, and a plurality of pixels. Each pixel may include first and second subpixels including first and second LC capacitors Clca and Clcb, a coupling capacitor Ccp, a storage capacitor Cst, and a TFT Q. The TFT Q has a control terminal (gate electrode) coupled with a gate line G, an input terminal (source electrode) coupled with a data line D, and an output terminal (drain electrode) coupled with the first LC capacitor Clca, the storage capacitor Cst, and the coupling capacitor Ccp. The coupling capacitor Ccp is coupled between the TFT Q and the second LC capacitor Clcb. The first/second LC capacitor Clca/Clcb is formed of a first/second subpixel electrode 190*a*/190*b*, a common electrode 270, and a region of a LC layer 300 disposed on the first/second pixel electrode 190*a*/190*b*. The storage capacitor Cst is formed of the pixel electrode 190, a storage electrode line 131, and insulator(s) 140 and 180 interposed therebetween. The coupling capacitor Ccp is formed of a coupling electrode 176, the second subpixel electrode 190*b*, and an insulator 140 interposed therebetween.

Since the second LC capacitor Clcb is coupled with the TFT Q or the first subpixel electrode 190*a* through the coupling capacitor Ccp, it is supplied with a voltage that differs from a voltage applied to the first subpixel electrode 190*a*. Here, the voltage of the second LC capacitor Clcb is less than the voltage of the first LC capacitor Clca. This configuration reduces the LCD's gamma curve distortion. The voltage of the second LC capacitor Clcb may be adjusted by varying the overlapping area between the coupling electrode 176 and the second subpixel electrode 190*b*.

Now, it will be described in detail why the capacitive coupling makes the magnitude of the voltages of the second LC capacitor Clcb lower than that of the first LC capacitor Clca.

The voltage across the first and the second LC capacitors Clca and Clcb is denoted by Va and Vb, respectively. Accordingly, the following formula shows the relationship between the voltages Va and Vb:

$$Vb = VA \times [Ccp/(Ccp+Clcb)].$$

Since Ccp/(Ccp+Clcb) is less than one, the voltage Vb is less than the voltage Va.

An LCD according to another exemplary embodiment of the present invention will be described in detail with reference to FIG. 5, FIG. 6, and FIG. 7.

Figure 5:
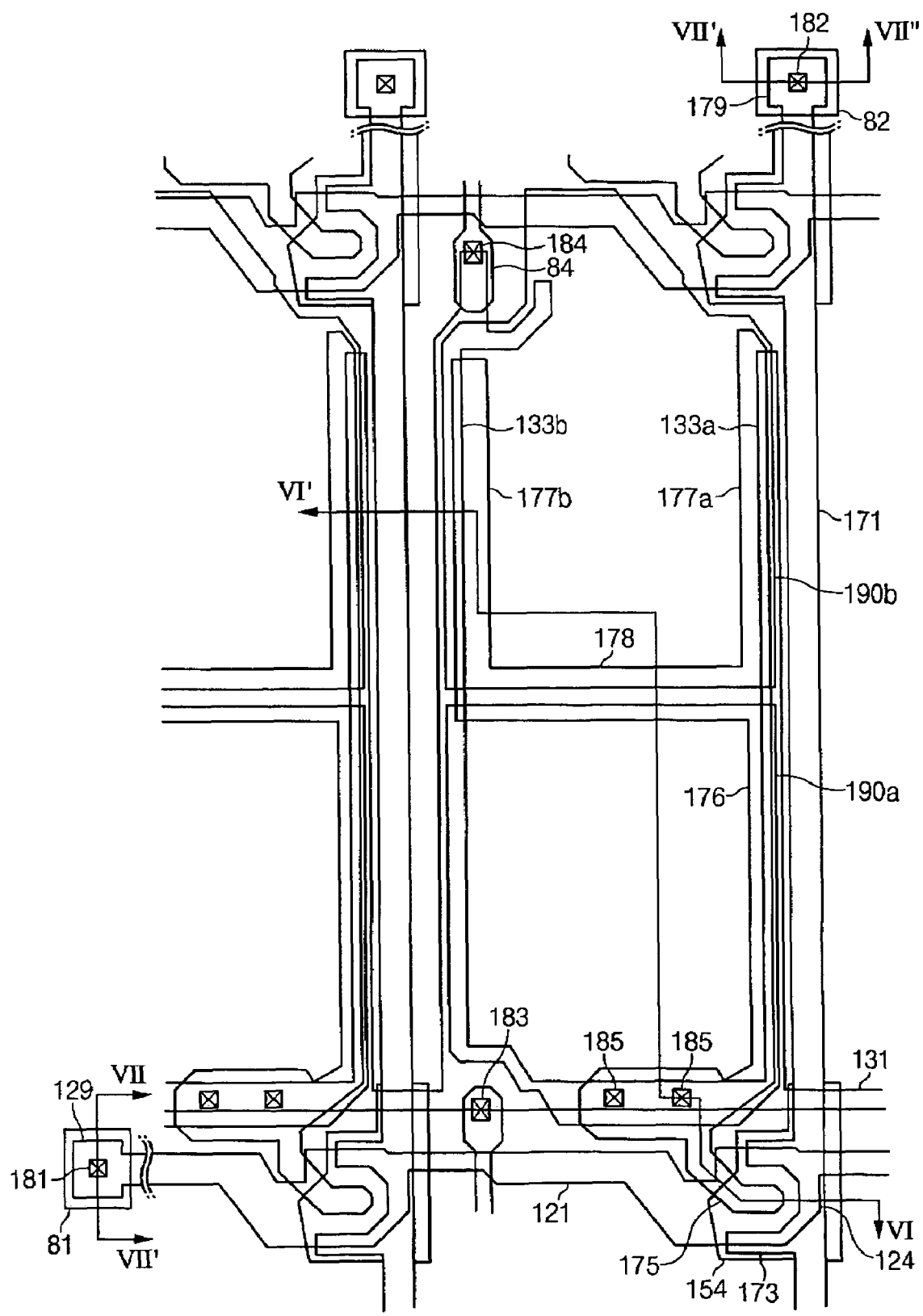
FIG. 5 is a layout view showing a TFT array panel for an LCD according to another exemplary embodiment of the present invention.
Figure 6:
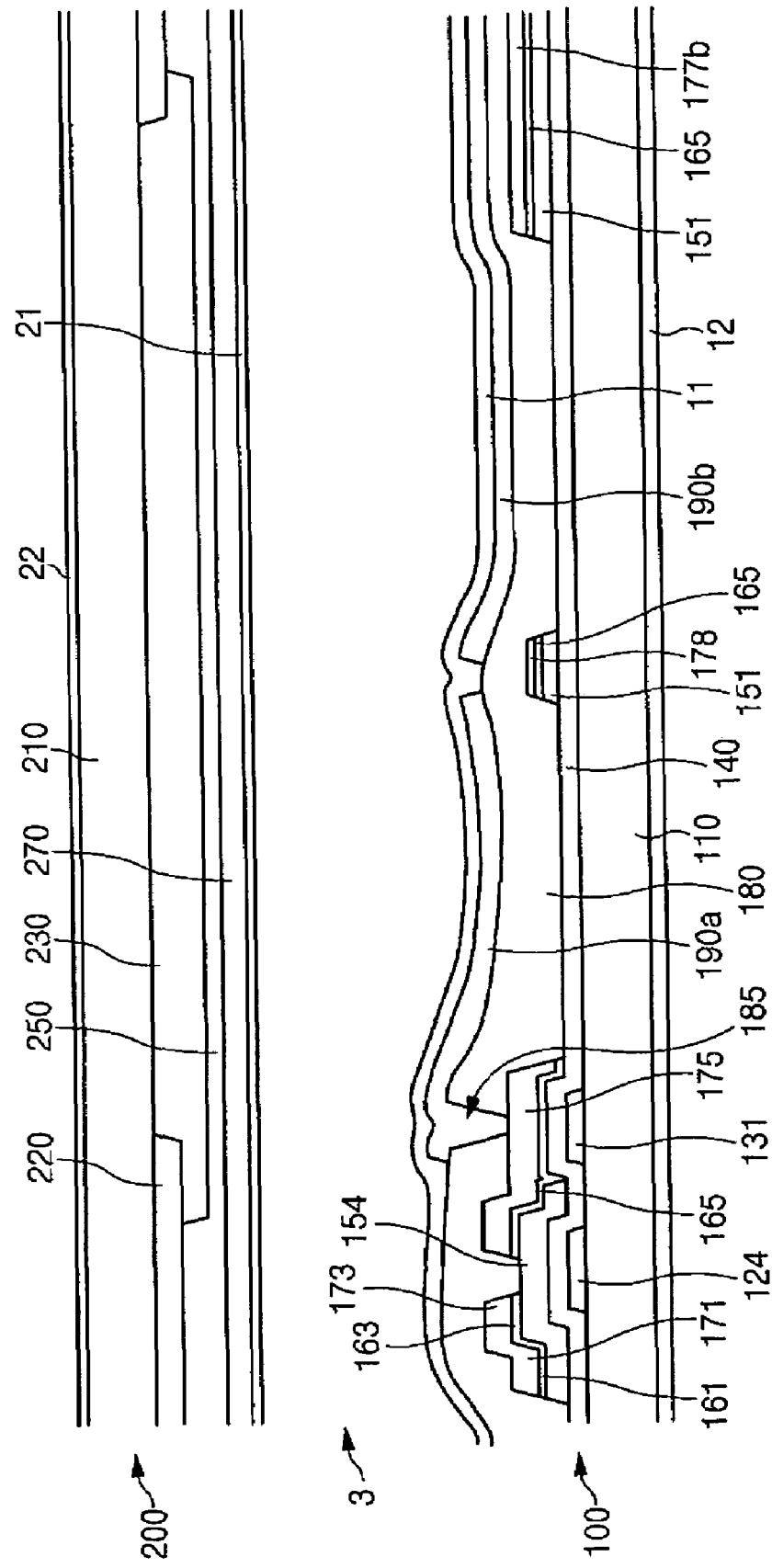
FIG. 6 is a sectional view of an LCD including the TFT array panel of FIG. 5 taken along line VI-VI' of FIG. 5.
Figure 7:
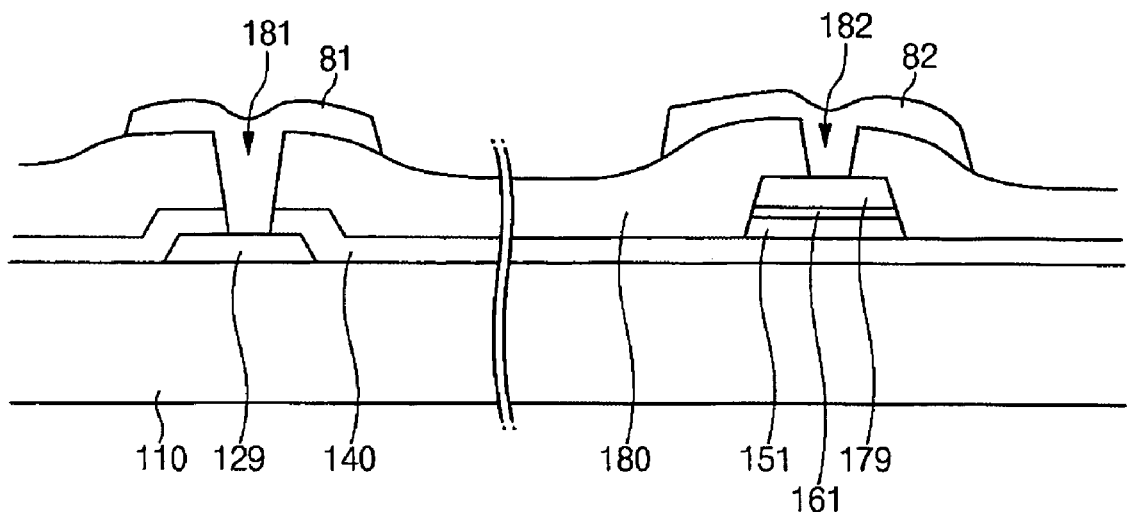
FIG. 7 is a sectional view showing an LCD including the TFT array panel of FIG. 5 taken along lines VII-VII' and VII'-VII" of FIG. 5.

FIG. 5 is a layout view showing a TFT array panel for an LCD according to another exemplary embodiment of the present invention, FIG. 6 is a sectional view of an LCD including the TFT array panel of FIG. 5 taken along line VI-VI' of FIG. 5, and FIG. 7 is a sectional view showing the LCD including the TFT array panel of FIG. 5 taken along lines VII-VII' and VII'-VII" of FIG. 5.

Referring to FIG. 5, FIG. 6, and FIG. 7, an LCD according to this embodiment may also include a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are similar to those shown in FIG. 1, FIG. 2, and FIG. 3.

Regarding the TFT array panel 100, a plurality of gate lines 121, which include gate electrodes 124 and end portions 129, and a plurality of storage electrode lines 131, which include storage electrodes 133*a* and 133*b*, may be formed on a substrate 110. Next, a gate insulating layer 140, a plurality of semiconductor stripes 151, which include projections 154, a plurality of ohmic contact stripes 161, which include projections 163, and a plurality of ohmic contact islands 165 may be sequentially formed thereon. A plurality of data lines 171, which include source electrodes 173 and end portions 179, and a plurality of drain electrodes 175, which include coupling electrodes 176, may be formed on the ohmic contacts 161 and 165, and a passivation layer 180 may be formed thereon. A plurality of contact holes 181, 182, 183, 184, and 185 are provided at the passivation layer 180 and the gate insulating layer 140. A plurality of pixel electrodes 190, including first and second subpixel electrodes 190*a* and 190*b*, a plurality of contact assistants 81 and 82, and a plurality of overpasses 84 may be formed on the passivation layer 180, and an alignment layer 11 is coated thereon.

Regarding the common electrode panel 200, a light blocking member 220, a plurality of color filters 230, an overcoat 250, a common electrode 270, and an alignment layer 21 may be formed on an insulating substrate 210.

Different from the LCD of FIG. 1, FIG. 2, and FIG. 3, the semiconductor stripes 151 of the TFT array panel 100 according to this embodiment have almost the same planar shape as the data lines 171, the drain electrodes 175, and the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel may include simultaneously forming the data lines 171, the drain electrodes 175, the semiconductors 151, and the ohmic contacts 161 and 165 using one photolithography process.

A photoresist pattern for the photolithography process has position-dependent thickness. In particular, it has first portions and second portions that are thinner than the first. The first portions are located on wire areas that will be occupied by the data lines 171, the drain electrodes 175, and the metal pieces 172, and the second portions are located on channel areas of TFTs.

The position-dependent thickness of the photoresist may be obtained by several techniques, such as, for example, providing translucent, transparent, and light blocking areas on the exposure mask. The translucent areas may have a slit pattern, a lattice pattern, and a thin film(s) with intermediate transmittance or intermediate thickness. When using a slit pattern, the width of the slits or the distance between the slits may be less than the resolution of a light exposer used for the photolithography. Using a reflowable photoresist is another example technique. In detail, after forming a photoresist pattern made of a reflowable material by using a normal exposure mask with transparent and opaque areas only, it is subject to a reflow process to flow onto areas without the photoresist, thereby forming thin portions.

As a result, the manufacturing process may be simplified by omitting a photolithography step.

Many of the above-described features of the LCD shown in FIG. 1, FIG. 2, and FIG. 3 may be appropriate to the TFT array panel shown in FIG. 5, FIG. 6, and FIG. 7.

Figure 8:
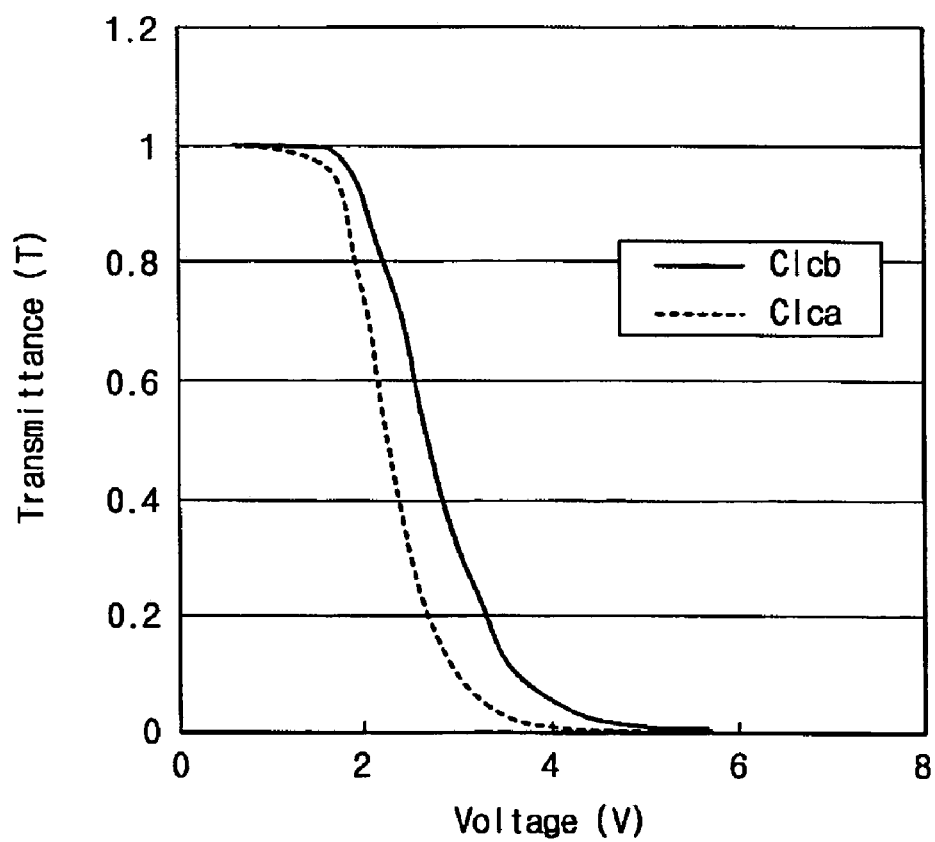
FIG. 8 is a graph illustrating light transmittance of the LCD of FIG. 1, FIG. 2, FIG. 3, and FIG. 4 as a function of data voltage.
Figure 9:
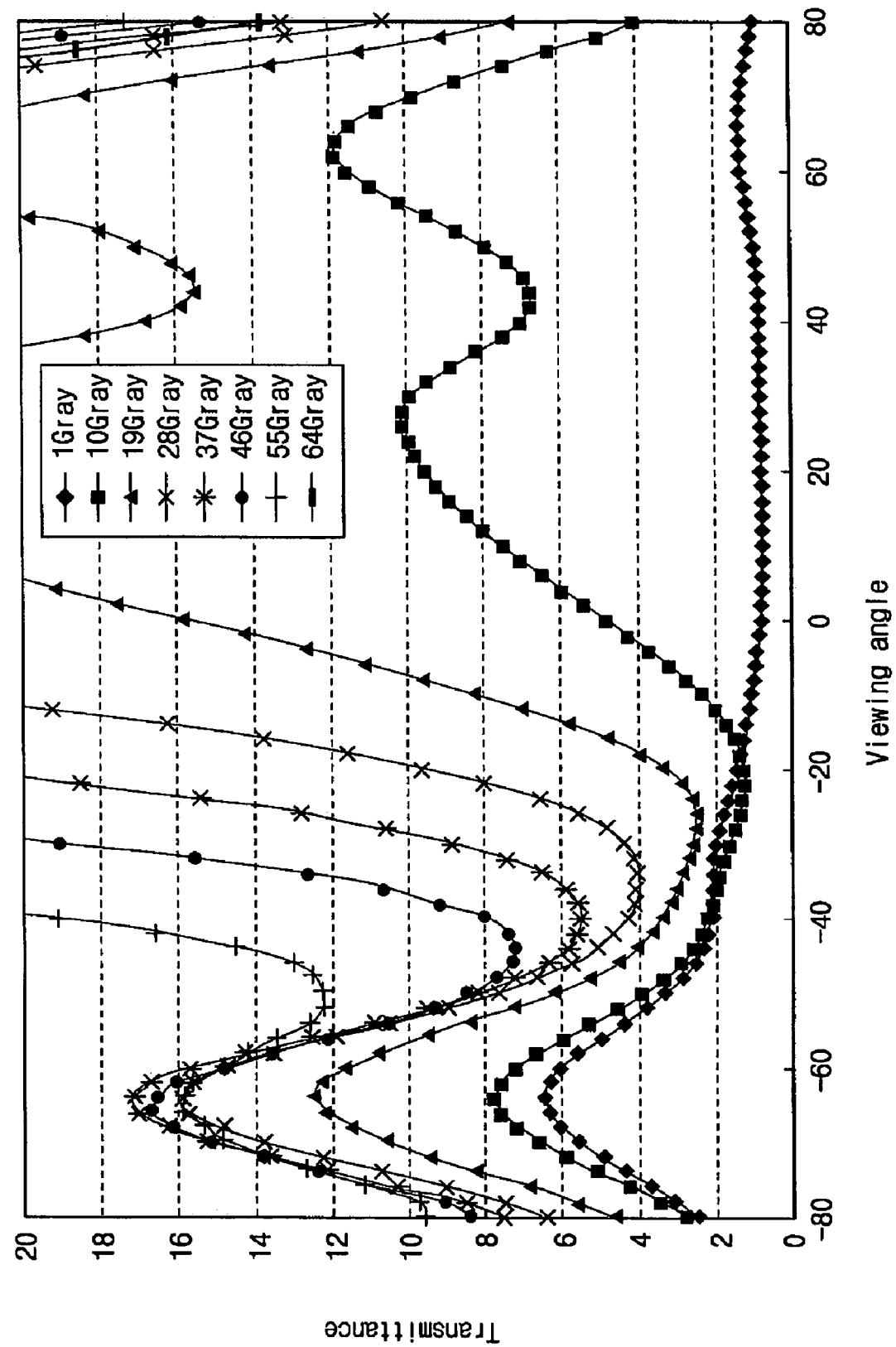

Referring to FIG. 8, FIG. 9, and FIG. 10, the advantages of the LCDs according to embodiments of the present invention will be described in detail.

FIG. 8 is a graph illustrating light transmittance of the LCD shown in FIGS. 1-4 as function of data voltage.

The LCD used in these experiments operates in a normally white mode. Referring to FIG. 1, the length La of the longitudinal edge of the first subpixel electrode 190a was 127 microns, and the overlapping width Wa of the first subpixel electrode 190a and the transverse portion 178 of the coupling electrode 176 was 5 microns. The length Lb of the longitudinal edge of the second subpixel electrode 190b was 127.5 microns, and the overlapping width Wb of the second subpixel electrode 190b and the transverse portion 178 of the coupling electrode 176 was 10 microns. W denotes the width of an area of the second subpixel electrode 190b that does not overlap the coupling electrode 176.

As FIG. 8 shows, the transmittance curve for the second LC capacitor Clcb shifted right as compared with that for the first LC capacitor Clca. Accordingly, for a given data voltage, the transmittance of the second LC capacitor Clcb may be higher than that of the first LC capacitor Clca. Hence, the voltage across the second LC capacitor Clcb may be lower than the voltage across the first LC capacitor Clca.

FIG. 9 and FIG. 10 are graphs illustrating light transmittance of a conventional TN type LCD and the LCD shown in FIGS. 1-4, respectively, for eight grays as function of viewing angle. The viewing angle left to zero is a lower viewing angle, and vice versa.

As FIG. 9 shows, the conventional LCD may have significant gray inversion for the lower viewing angle in a range of about −60 to −80°, while, as FIG. 10 shows, the LCD of FIGS. 1-4 has little gray inversion.

Consequently, the embodiments of the present invention may reduce the gray inversion in the lower view angles, thereby improving lateral visibility.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A thin film transistor (TFT) array panel, comprising:
   a substrate;
   a gate line formed on the substrate;
   a gate insulating layer formed on the gate line;
   a semiconductor layer formed on the gate insulating layer;
   a data line formed on the semiconductor layer;
   a drain electrode separated from the data line and formed on the semiconductor layer;
   a coupling electrode comprising integral first and second portions extending from the drain electrode, wherein the first and second portions extend along different directions from each other;
   a first subpixel electrode connected to the drain electrode; and
   a second subpixel electrode separated from the first subpixel electrode and overlapping the coupling electrode,
   wherein a gap between the first subpixel electrode and the second subpixel electrode and the first portion of the coupling electrode are formed in a same direction and overlap each other, and the second portion of the coupling electrode extends along the data line.

2. The TFT array panel of claim 1, wherein the coupling electrode comprises the same layer as the gate line or the drain electrode.

3. The TFT array panel of claim 1, further comprising a storage electrode overlapping with the coupling electrode.

4. The TFT array panel of claim 1, further comprising:
   a passivation layer formed on the data line and the drain electrode,
   wherein the drain electrode is coupled with the first subpixel electrode through a contact hole in the passivation layer.

5. The TFT array panel of claim 1, wherein the second subpixel electrode is floated.

6. A liquid crystal display, comprising:
   a first panel; and
   a second panel facing the first panel and including a common electrode; and
   a liquid crystal layer disposed between the first panel and the second panel, wherein the first panel comprises:
   a gate line;
   a gate insulating layer formed on the gate line;
   a semiconductor layer formed on the gate insulating layer;
   a data line formed on the semiconductor layer;
   a drain electrode separated from the data line and formed on the semiconductor layer;
   a coupling electrode comprising integral first and second portions extending from the drain electrode, wherein the first and second portions extend along different directions from each other;
   a first subpixel electrode connected to the drain electrode; and
   a second subpixel electrode separated from the first subpixel electrode and overlapping the coupling electrode,
   wherein a gap between the first subpixel electrode and the second subpixel electrode and the first portion of the coupling electrode are formed in a same direction and overlap each other, and the second portion of the coupling electrode extends along the data line.

7. The liquid crystal display of claim 6, wherein the liquid crystal display is a twisted nematic type.

8. A pixel region of a thin film transistor (TFT) array panel, comprising:
   a TFT having a gate electrode coupled to a first signal line and a first electrode coupled to a second signal line;
   a coupling electrode comprising integral first and second portions extending from a second electrode of the TFT, wherein the first and second portions extend along different directions from each other;
   a first subpixel electrode connected to the second electrode; and
   a second subpixel electrode separated from the first subpixel electrode and overlapping the coupling electrode, wherein the pixel region is within adjacent first signal lines and adjacent second signal lines, and a gap between the first subpixel electrode and the second subpixel electrode and the first portion of the coupling electrode are formed in a same direction and overlap each other, and the second portion of the coupling electrode extends along the second signal line.

9. The pixel region of claim 8, wherein the coupling electrode is formed of the same layer as the drain electrode.

10. The pixel region of claim 9, wherein the second subpixel electrode is floated.

11. A liquid crystal display comprising a thin film transistor array panel having the pixel region of claim 8.

12. The liquid crystal display of claim 11, wherein the liquid crystal display is a twisted nematic type.

\* \* \* \* \*